US011397278B2

(12) United States Patent
Tiedemann et al.

(10) Patent No.: US 11,397,278 B2
(45) Date of Patent: Jul. 26, 2022

(54) DETERMINING A NUMERICAL AGE FOR GEOLOGICAL EVENTS WITHIN A SCHEME (71) Applicant: LANDMARK GRAPHICS CORPORATION, Houston, TX (US)

(72) Inventors: Nicholas Scott Tiedemann, Denver, CO (US); Nicholas Alan Matthies, Highlands Ranch, CO (US); Rachel Bernadette Zaborski, Oxford (GB); Edward Patrick Ellwyn Collins, Bristol (GB); Richard James Martin, Oxford (GB); Loring Nicholas Harvey, Iver (GB); Kieran Bowen, Brightwell-sum-Sotwell (GB)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 918 days.

(21) Appl. No.: 16/303,877

(22) PCT Filed: Jul. 15, 2016

(86) PCT No.: PCT/US2016/042634
§ 371 (c)(1),
(2) Date: Nov. 21, 2018

(87) PCT Pub. No.: WO2018/013141
PCT Pub. Date: Jan. 18, 2018

(65) Prior Publication Data
US 2020/0326455 A1 Oct. 15, 2020

(51) Int. Cl.
*E21B 49/00* (2006.01)
*G01V 99/00* (2009.01)

(52) U.S. Cl.
CPC ............ *G01V 99/005* (2013.01); *E21B 49/00* (2013.01); *G01V 2210/661* (2013.01)

(58) Field of Classification Search
CPC .... G01V 99/005; G01V 99/00; G01V 10/661; G01V 10/66; G01V 10/60; G01V 10/00; E21B 49/00
See application file for complete search history.

(56) References Cited

U.S. PATENT DOCUMENTS

| 8,515,721 B2 | 8/2013 | Morton et al. |
| 2008/0140319 A1* | 6/2008 | Monsen ................ G01V 11/00 |
| | | 702/16 |

(Continued)

FOREIGN PATENT DOCUMENTS

WO 9928767 A1 6/1999

OTHER PUBLICATIONS

Office Action; U.S. Appl. No. 3/023,864; dated Aug. 4, 2020.

(Continued)

*Primary Examiner* — Mohamed Charioui
(74) *Attorney, Agent, or Firm* — Novak Druce Carroll LLP (57) ABSTRACT

Systems and methods for determining a numerical age for new geological events within a new scheme by ordering relations between geological events within a new scheme and/or within a new scheme and a preexisting scheme into a preferred hierarchy, dynamically excluding lower relations in the preferred hierarchy that conflict with higher relations due to irreconcilable ages of the relations, and using the ordered relations remaining in the preferred hierarchy to determine a numerical age for the new geological events within the new scheme.

20 Claims, 11 Drawing Sheets (56) References Cited

U.S. PATENT DOCUMENTS

| | | | |
|---|---|---|---|
| 2008/0195319 A1 | 8/2008 | Wilkinson et al. | |
| 2011/0002194 A1* | 1/2011 | Imhof | G01V 1/32 367/53 |
| 2011/0208499 A1 | 8/2011 | Verscheure | |
| 2012/0215628 A1* | 8/2012 | Williams | E21B 47/06 705/14.49 |
| 2013/0096703 A1* | 4/2013 | Kurtenbach | G06F 3/0484 700/90 |

OTHER PUBLICATIONS

International Search Report and Written Opinion; PCT Application PCT/US2016/042634; dated Apr. 14, 2017.

Felix M. Gradstein et al., "A new Geologic Time Scale, with special reference to Precambrian and Neogene", Episodes, vol. 27, No. 2, pp. 83-100; Jun. 2004.

* cited by examiner

Calculated Age Relations

✻ ✕ △ ▽ ⊟ ⊞  Event A: 175.05 ± 0.95 Ma

☑ ▽ 174.1-182.7 Ma
  Scheme: [Geologic Timescale ▽]
  ○ Equal to  ○ Older Than  ○ Younger Than  ◉ Within Interval
  [Toarcian, 174.1-182.7 Ma ▽]

☑ ▽ >184.0 Ma
  Scheme: [Pre-existing Scheme ▽]
  ○ Equal to  ◉ Older Than  ○ Younger Than  ○ Within Interval
  Older Than: [Event X, 179 Ma ▽]

☑ ▽ <176.0 Ma
  Scheme: [Pre-existing Scheme ▽]
  ○ Equal to  ○ Older Than  ◉ Younger Than  ○ Within Interval
  Younger Than: [Event Y, 188 Ma ▽]

☒ ▽ >184.0 Ma
  Scheme: [Pre-existing Scheme ▽]
  ○ Equal to  ◉ Older Than  ○ Younger Than  ○ Within Interval
  Older Than: [Event Z, 196.0 Ma ▽]

| Geologic Timescale Scheme | Pre-Existing Scheme | New Scheme |
|---|---|---|

Geologic Timescale Scheme:
- Mesozoic / Jurassic / Middle
  - Bathonian — 168.3
  - Bajocian — 170.3
  - Aalenian — 174.1
- Jurassic / Early
  - Toarcian — 182.7
  - Pliensbachian — 190.8
  - Sinemurian — 199.3
  - Hettangian — 201.3
- Rhaetian Pre-Existing Scheme:
- Event X - 179.0
- Event Y - 188.0
- Event Z - 196.0

New Scheme:
- Event A
  1. Within Interval 'Toarcian'
  2. Older than Event X
  3. Younger than Event Y
  4. ~~Older than Event Z~~ (Conflicts with 1 and 3)

DETERMINING A NUMERICAL AGE FOR GEOLOGICAL EVENTS WITHIN A SCHEME

CROSS-REFERENCE TO RELATED APPLICATIONS

This application is a national stage entry of PCT/US2016/042634 filed Jul. 15, 2016, said application is expressly incorporated herein in its entirety.

FIELD OF THE DISCLOSURE

The present disclosure generally relates to systems and methods for determining a numerical age for geological events within a scheme. More particularly, the present disclosure relates to determining a numerical age for new geological events within a new scheme by ordering relations between geological events within a new scheme and/or within a new scheme and a preexisting scheme into a preferred hierarchy, dynamically excluding lower relations in the preferred hierarchy that conflict with higher relations due to irreconcilable ages of the relations, and using the relations remaining in the preferred hierarchy to determine a numerical age for the new geological events within the new scheme.

BACKGROUND

Chronostratigraphy is the branch of stratigraphy that studies the age of rock strata in relation to time. The ultimate goal of chronostratigraphy is to arrange the sequence of deposition and the time of deposition of all rocks globally, through the dating of geologic events and intervals between events recorded in the rocks The standard stratigraphic nomenclature, known as the geologic timescale, is a chronostratigraphic system based primarily on intervals of time defined by fossil assemblages (biostratigraphy), radiometric dating, and other recognized patterns in sedimentary rocks. The aim of chronostratigraphy is to give meaningful numerical age to events and intervals of geologic time. Chronostratigraphy relies heavily upon isotope geology and geochronology to derive hard dating of known and well defined rock units, which contain the specific fossil assemblages defined by the stratigraphic system. Because it is very difficult to date most fossils and sedimentary rocks directly, inferences must be made in order to arrive at an accurate numerical age for any given event or interval within a sedimentary rock sequence.

The oil and gas industry predominantly uses chronostratigraphy to estimate a date for sedimentary rocks and identify areas of hydrocarbon reserves (i.e. drilling prospects). One approach allows geologic events or intervals to be related to intervals in a pre-existing scheme such as the geologic timescale. If a subdivision is defined in the pre-existing scheme, the encompassing category within the same scheme is automatically known. For example, any event or interval related to the Toarcian subdivision is always known to be within the encompassing Jurassic category. This approach therefore enforces a single relative age rule per event or interval to help mitigate error.

Another approach displays chronostratigraphic data in geological time using hard-coded numerical ages. A numerical age must be locked-in for any event or interval to be displayed in geological time. Interval data are defined only on their top or base ages, so schemes must be built up by an administrator and the addition of new intervals and revision of existing intervals is difficult and time consuming.

Due to the inherent uncertainty of geological age information, ages of geological events are constantly subject to revision. The forgoing conventional approaches rely upon a single relation and/or absolute numerical age per event, and lack the capacity to automatically calculate the numerical age of an event based upon multiple age relations as the respective age of events changes. As a result, inconsistencies between events develop.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by ordering relations between geological events within a new scheme and/or within a new scheme and a preexisting scheme into a preferred hierarchy, dynamically excluding lower relations in the preferred hierarchy that conflict with higher relations due to irreconcilable ages of the relations, and using the relations remaining in the preferred hierarchy to determine a numerical age for the new geological events within the new scheme.

In one embodiment, the present disclosure includes a method for determining a numerical age for geological events within a chronostratigraphic scheme, which comprises: a) relating each new event in a new scheme to at least one of one or more other new events in the new scheme, one or more preexisting events in a preexisting scheme and one or more intervals in a preexisting scheme, wherein the new scheme is a collection of each new event, each new event lacks a geological age, and an interval is a time between any two adjacent preexisting events, which represent interval events within the same preexisting scheme; b) ordering each relation from step a) into a preferred hierarchy for each new event in the new scheme; c) amending the preferred hierarchy, using a computer processor, by starting with the highest relation in the preferred hierarchy and removing each lower relation in the preferred hierarchy that conflicts with a higher relation remaining in the preferred hierarchy; and d) calculating a numerical age of each new event, using the computer processor, based upon each relation from step a) in the amended preferred hierarchy.

In another embodiment, the present disclosure includes a non-transitory storage device tangibly carrying computer executable instructions for determining a numerical age for geological events within a chronostratigraphic scheme, the instructions being executable to implement: a) relating each new event in a new scheme to at least one of one or more other new events in the new scheme, one or more preexisting events in a preexisting scheme and one or more intervals in a preexisting scheme, wherein the new scheme is a collection of each new event, each new event lacks a geological age, and an interval is a time between any two adjacent preexisting events, which represent interval events within the same preexisting scheme; b) ordering each relation from step a) into a preferred hierarchy for each new event in the new scheme; c) amending the preferred hierarchy, using a computer processor, by starting with the highest relation in the preferred hierarchy and removing each lower relation in the preferred hierarchy that conflicts with a higher relation remaining in the preferred hierarchy; and d) calculating a numerical age of each new event, using the computer processor, based upon each relation from step a) in the amended preferred hierarchy.

In yet another embodiment, the present disclosure includes a non-transitory storage device tangibly carrying computer executable instructions for determining a numerical age for geological events within a chronostratigraphic scheme, the instructions being executable to implement: a) relating each new event in a new scheme to at least one of one or more other new events in the new scheme, one or more preexisting events in a preexisting scheme and one or more intervals in a preexisting scheme, wherein the new scheme is a collection of each new event, each new event lacks a geological age, and an interval is a time between any two adjacent preexisting events within the same preexisting scheme; b) ordering each relation from step a) into a preferred hierarchy for each new event in the new scheme; c) amending the preferred hierarchy, using a computer processor, by starting with the highest relation in the preferred hierarchy and removing each lower relation in the preferred hierarchy that conflicts with a higher relation remaining in the preferred hierarchy; d) calculating a numerical age of each new event, using the computer processor, based upon each relation from step a) in the amended preferred hierarchy; and e) associating one or more preexisting data objects with each respective new event.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be described with respect to the oil and gas industry, it is not limited thereto and may also be applied in other industries (e.g. drilling water wells) to achieve similar results.

Method Description

Figure 1:
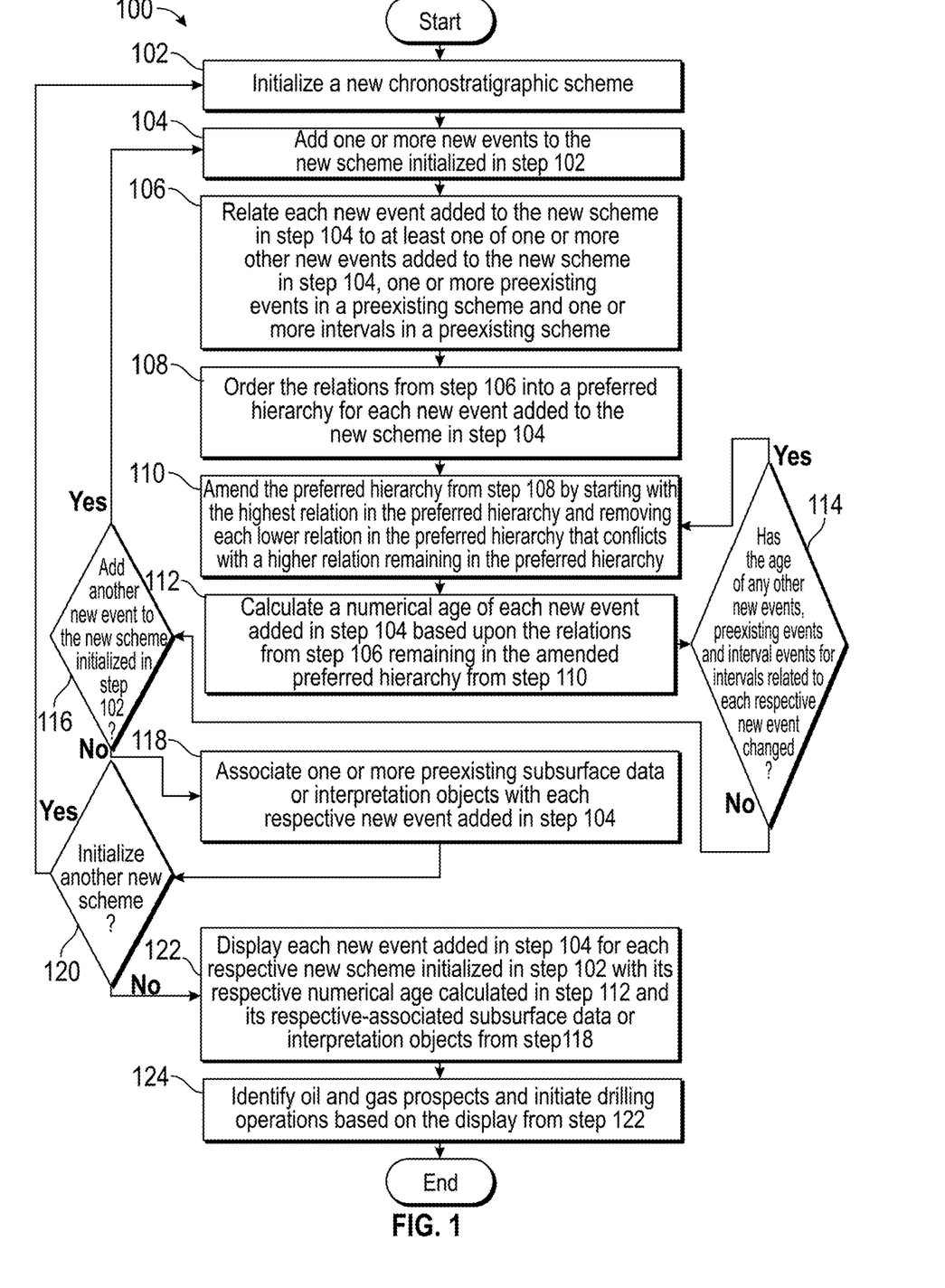
FIG. 1 is a flow diagram illustrating one embodiment of a method for implementing the present disclosure.

Referring now to FIG. 1, a flow diagram illustrates one embodiment of a method 100 for implementing the present disclosure.

Figure 9:
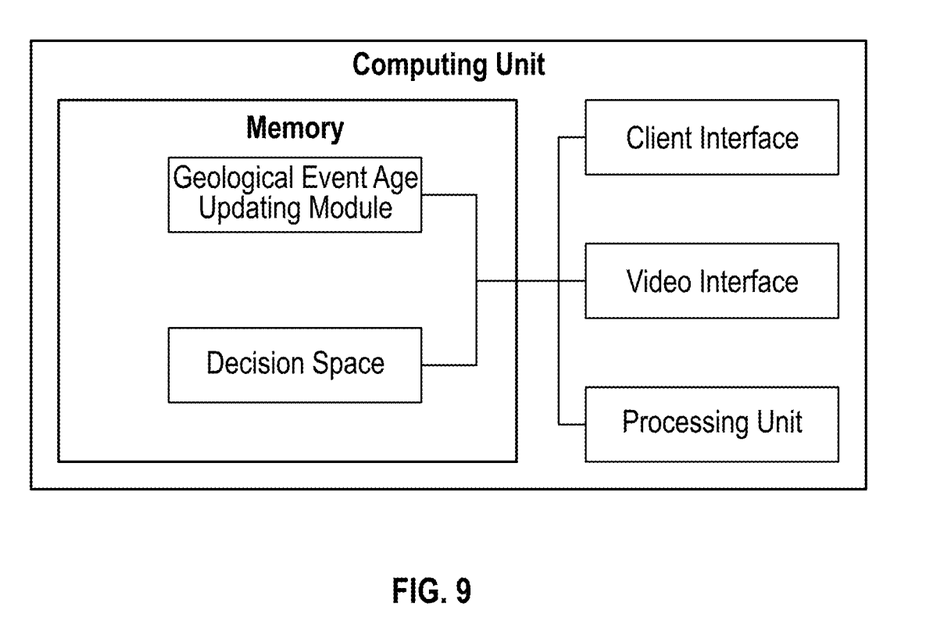
FIG. 9 is a block diagram illustrating one embodiment of a computer system for implementing the present disclosure.

In step 102, a new chronostratigraphic scheme is initialized using the client interface and/or the video interface described further in reference to FIG. 9. A chronostratigraphic scheme (hereinafter "scheme") is a collection of events, wherein each event represents a single moment in geologic time. The new scheme is initialized without events as a placeholder.

In step 104, one or more new events are added to the new scheme initialized in step 102 using the client interface and/or the video interface described further in reference to FIG. 9. Each new event added to the new scheme lacks a geologic age.

Figure 2A:
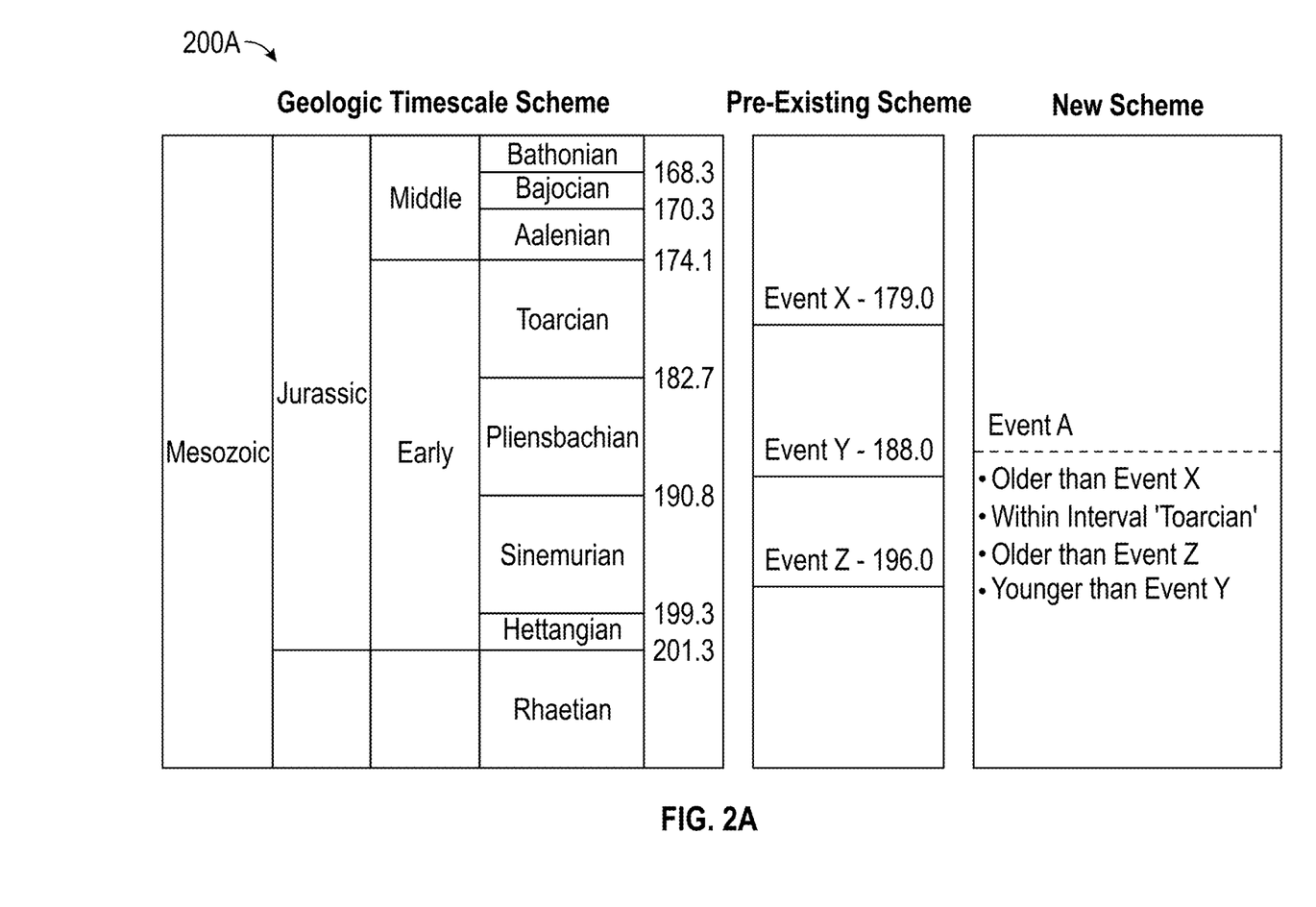
FIG. 2A is a schema diagram illustrating step 106 in FIG. 1.
Figure 2B:
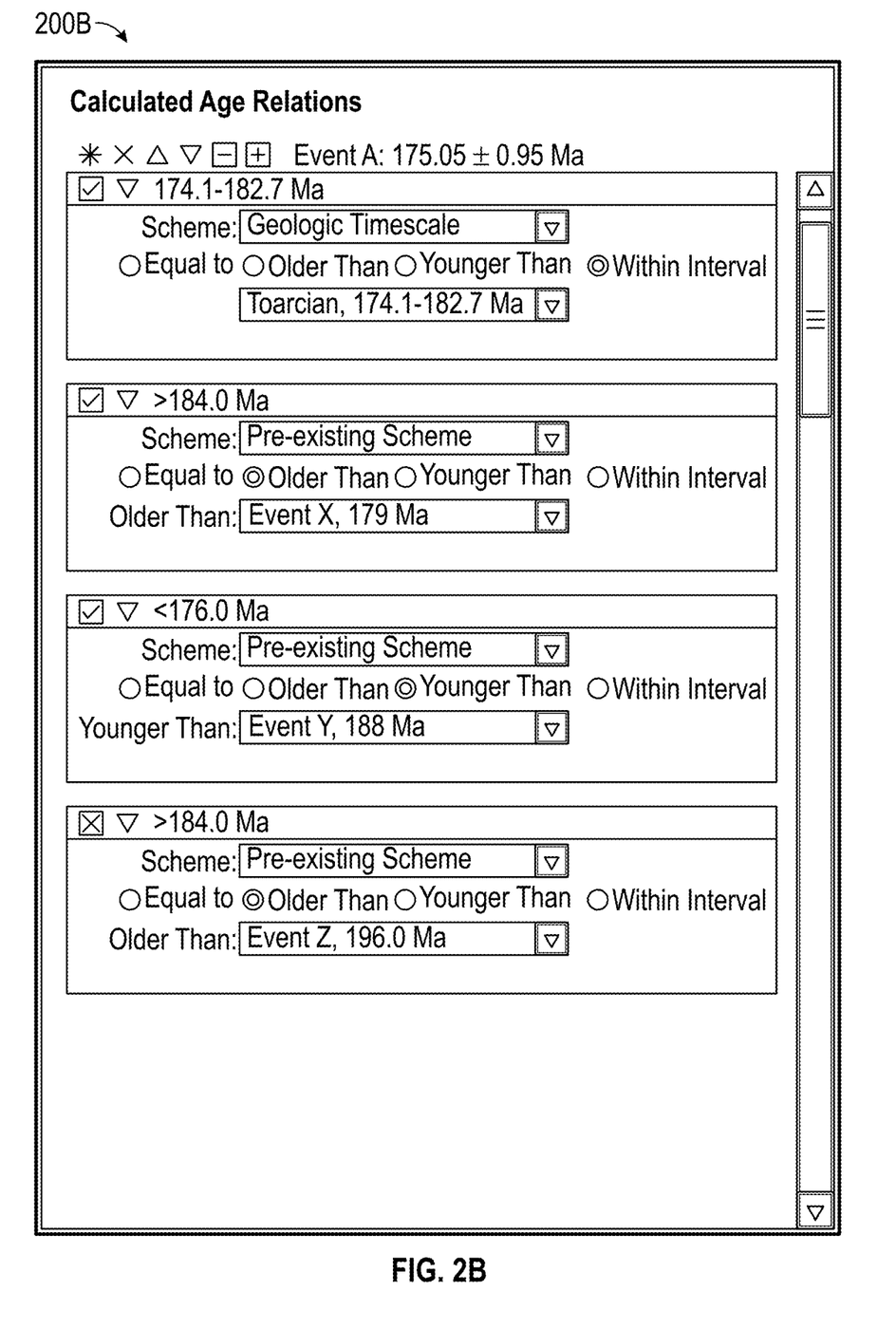
FIG. 2B is an exemplary client interface illustrating how the relations may be entered for the events and their respective schemes in FIG. 5.

In step 106, each new event added to the new scheme in step 104 is related to at least one of one or more other new events added to the new scheme in step 104, one or more preexisting events in a preexisting scheme and one or more intervals in a preexisting scheme using the client interface and/or the video interface described further in reference to FIG. 9. An interval represents the time between any two adjacent preexisting events (interval events) within the same preexisting scheme such as, for example, the well-known geologic timescale scheme and the Neftex sequence model scheme. Each relation is characterized as equal to, younger than, older than, or within an interval, and thus establishes an age relation. In FIG. 2A, a schema diagram 200A illustrates the well-known geologic time scale scheme, a pre-existing scheme with preexisting events (X,Y,Z), a new scheme with a new event (A) and its relations according to this step. As demonstrated by the relations, the new event (A) is related to the preexisting events (X,Y,Z) in the preexisting scheme and the Toarcian interval in the geologic timescale scheme. In FIG. 2B, an exemplary client interface 200B illustrates how the relations may be entered for the events and their respective schemes in FIG. 5.

Figure 3:
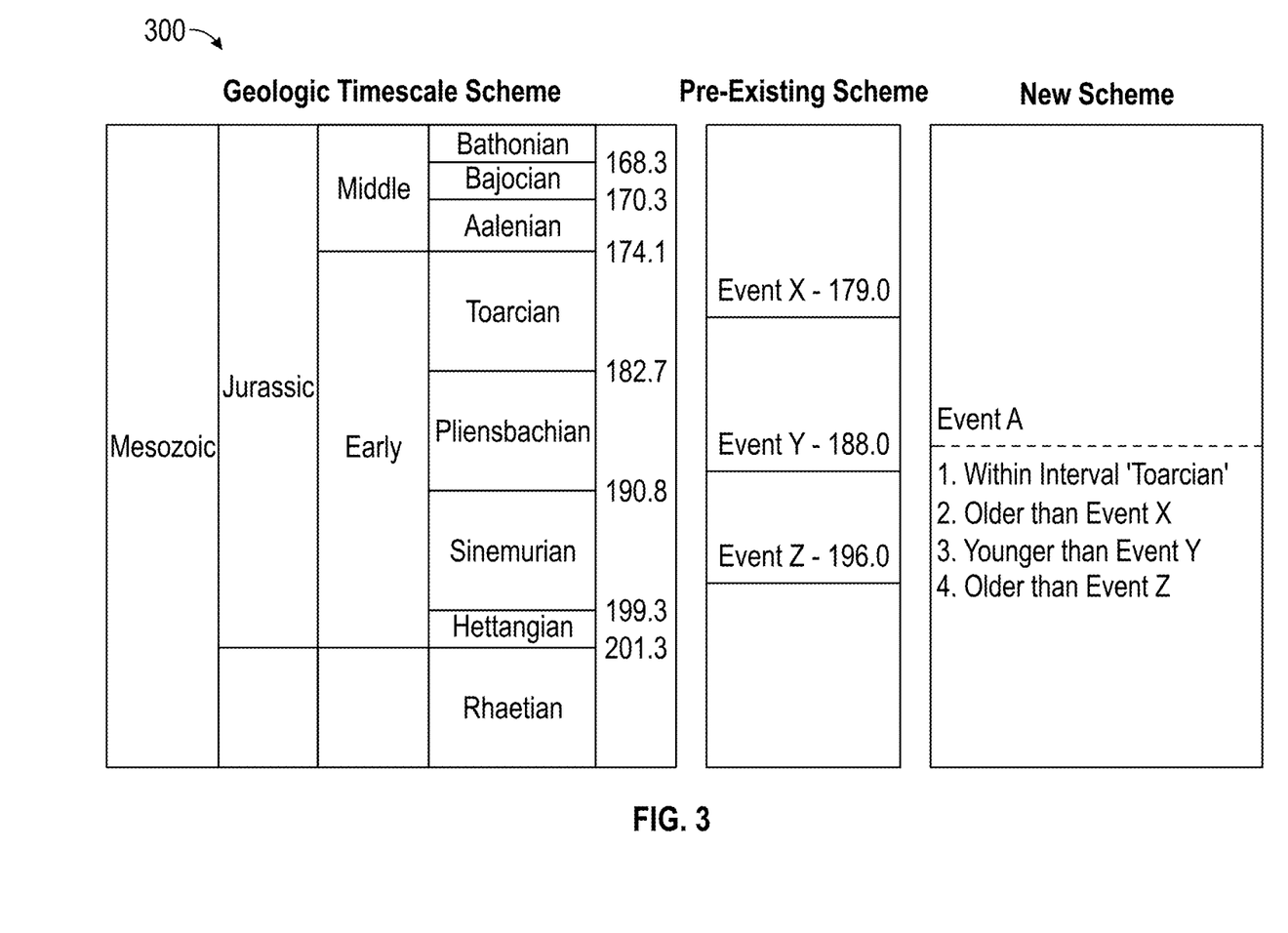
FIG. 3 is a schema diagram illustrating step 108 in FIG. 1.

In step 108, the relations from step 106 are ordered into a preferred hierarchy for each new event added to the new scheme in step 104 using the client interface and/or the video interface described further in reference to FIG. 9. Preferably, higher confidence relations are ordered near the top of the preferred hierarchy and lower confidence relations are ordered near the bottom of the preferred hierarchy. In FIG. 3, a schema diagram 300 illustrates the relations for the new event (A) in FIG. 2A ordered in a preferred hierarchy according to this step. As demonstrated by the preferred hierarchy, the top entry (1) is given the highest confidence and the bottom entry (4) is given the lowest confidence.

Figure 4:
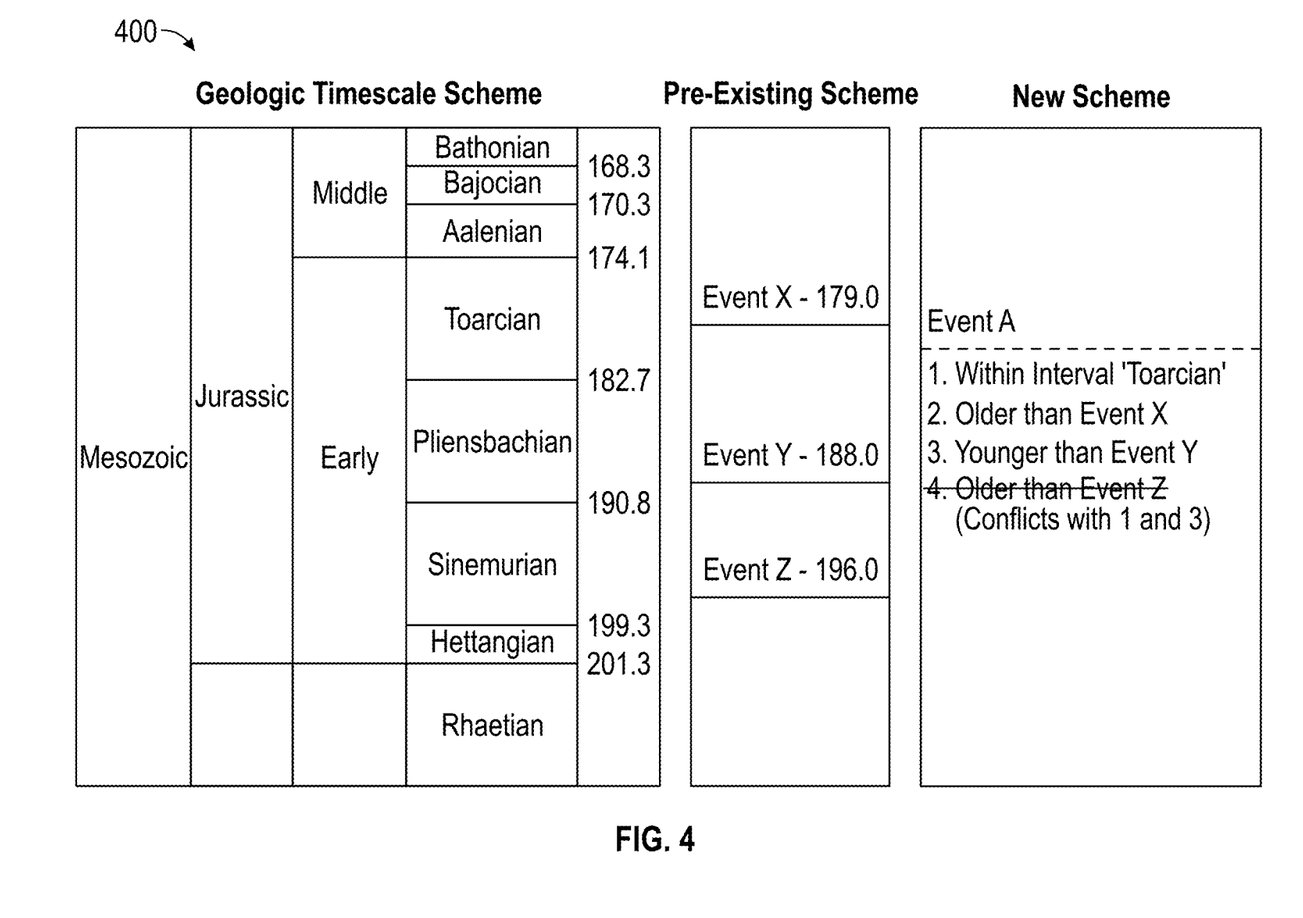
FIG. 4 is a schema diagram illustrating step 110 in FIG. 1.

In step 110, the preferred hierarchy from step 108 is amended by starting with the highest relation in the preferred hierarchy and removing each lower relation in the preferred hierarchy that conflicts with a higher relation remaining in the preferred hierarchy. A conflict occurs between a lower relation and a higher relation if the age established by the lower relation is not logically reconcilable with the age established by a higher relation remaining in the preferred hierarchy. Any conflicting relations are displayed using the client interface and/or the video interface described further in reference to FIG. 9. In FIG. 4, a schema diagram 400 illustrates the amendment of the preferred hierarchy of ordered relations from FIG. 3 according to this step. Because the lowest relation (4) conflicts with a higher relation (1 and 3) remaining in the preferred hierarchy, it is automatically removed and the conflict is displayed by striking through the lowest relation. Other techniques, however, may be used to display a conflict removed from the preferred hierarchy.

Figure 5:
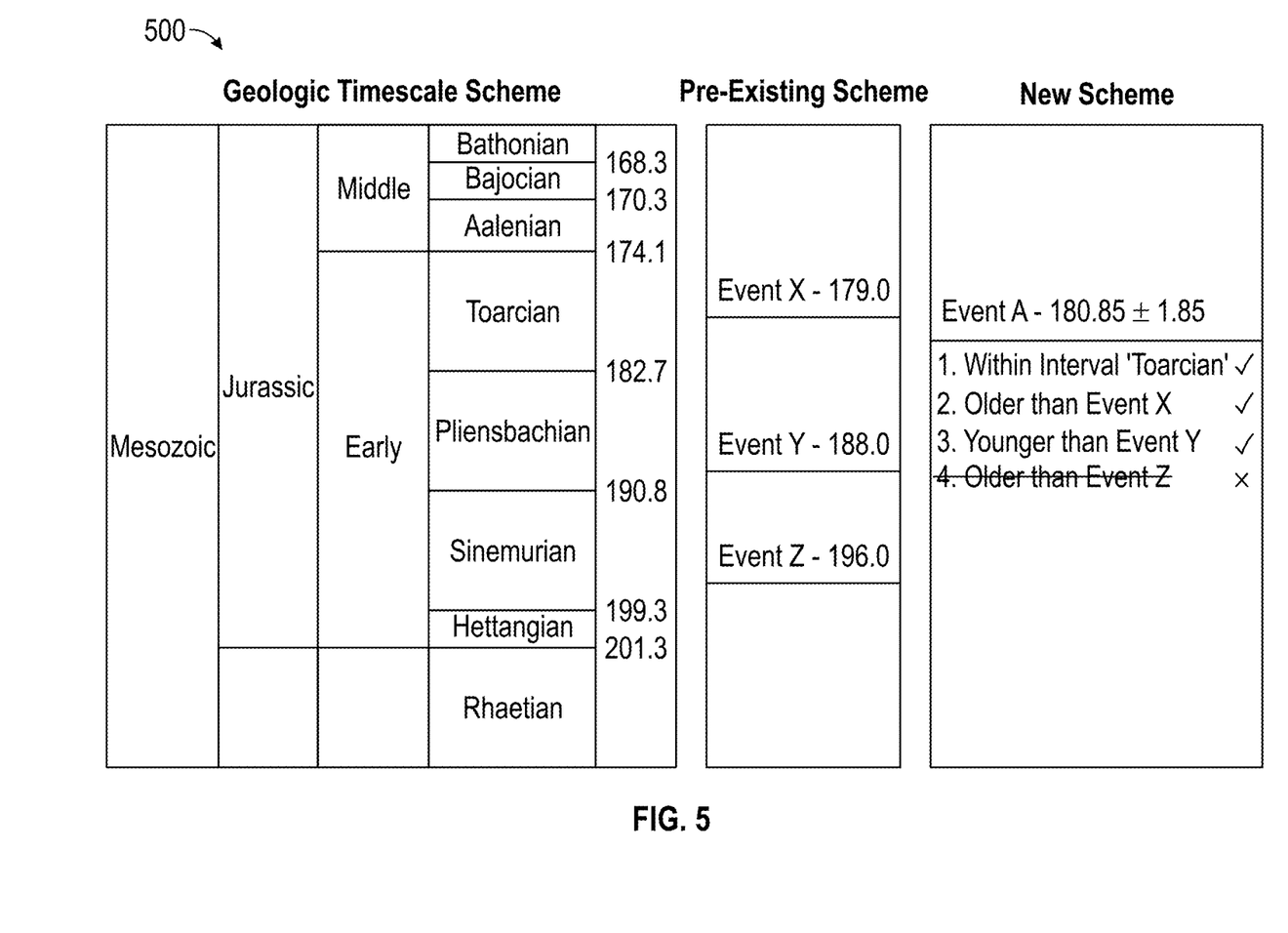
FIG. 5 is a schema diagram illustrating step 112 in FIG. 1.

In step 112, a numerical age of each new event added in step 104 is calculated based upon the relations from step 106 remaining in the amended preferred hierarchy from step 110. The numerical age of a new event is thus calculated by determining which two events constrain the new event to a smallest numerical age range between the two events by their respective relations to the new event in the amended preferred hierarchy and averaging the numerical age of the two events. In FIG. 5, a schema diagram 500 illustrates the numerical age calculated for the new event (A), based upon the relations remaining in the amended preferred hierarchy, in FIG. 4 according to this step. The two events that constrain the new event (A) to a smallest numerical age range between the two events by their respective relations to the new event are event X (179) and the event (182.7) that forms an extent of the Toarcian interval. Averaging the numerical age of the two events [(179+182.7)/2] produces the numerical age (180.85) of the new event (A) with an uncertainty margin of +/−1.85. The uncertainty margin represents the difference in numerical age between the new event (A) and each of the two events that constrain the new event (A).

Figure 6:
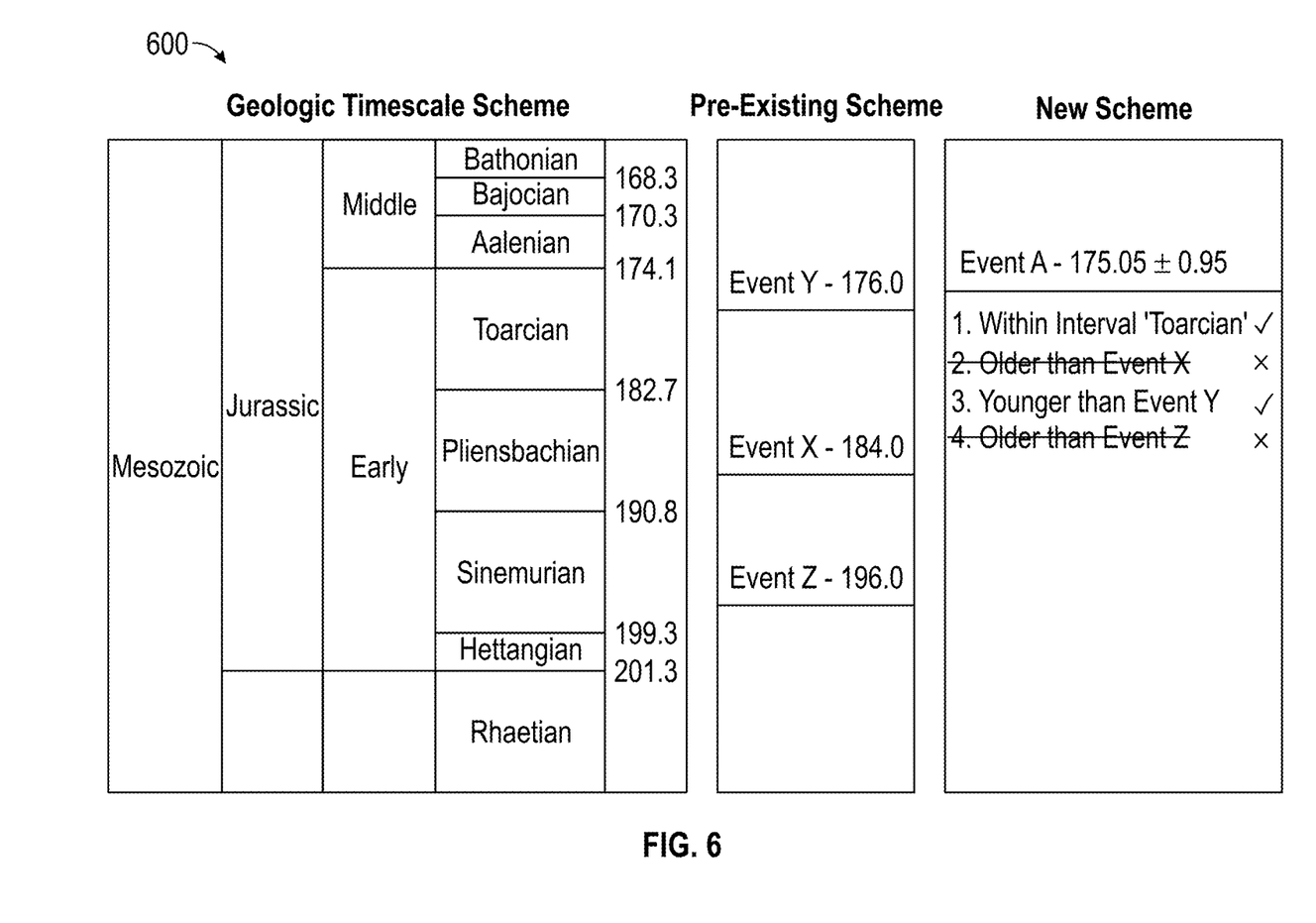
FIG. 6 is a schema diagram illustrating step 114 in FIG. 1.

In step 114, the method 100 determines if the age of any other new events, preexisting events and interval events for intervals related to each respective new event have changed. If the age of any other new events, preexisting events and interval events for intervals related to each respective new event have changed, then the method 100 returns to step 110. Otherwise, the method 100 proceeds to step 116. Because global chronostratigraphic data is under constant revision for determining a more accurate age, the age of certain events is constantly undergoing revision. Steps 110-114 thus, permit the numerical age for each new event to update dynamically as the age of certain events changes. In FIG. 6, a schema diagram 600 illustrates how the numerical age calculated for the new event (A) in FIG. 5 is dynamically updated during steps 110-114 as a result of a change in the age of event X (184) and event Y (176).

In step 116, the method 100 determines if another new event should be added to the new scheme initialized in step 102. If another new event should be added to the new scheme initialized in step 102, then the method 100 returns to step 104. Otherwise, the method 100 proceeds to step 118.

Figure 7A:
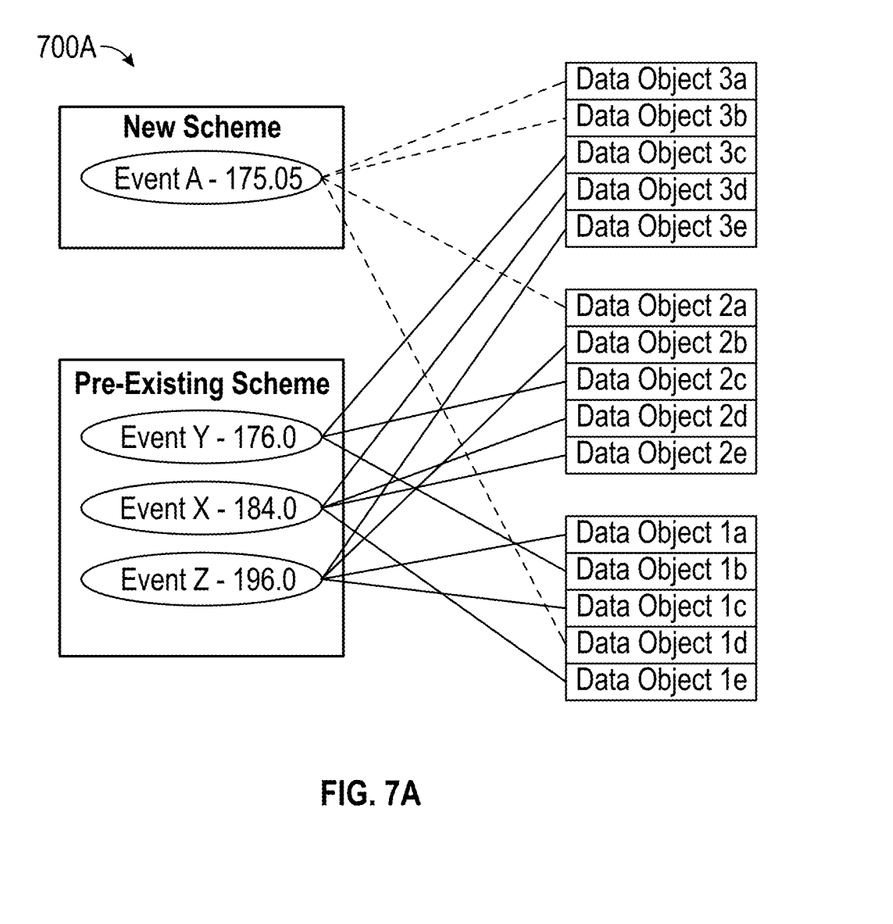
FIG. 7A is a schema diagram illustrating step 118 in FIG. 1.

In step 118, one or more preexisting subsurface data or interpretation objects (including but not limited to well picks, seismic horizons, biostratigraphic information, subsurface maps, and modeled surfaces) are associated with each respective new event added in step 104 using techniques well-known in the art. In FIG. 7A, a schema diagram 700A illustrates with dashed lines how preexisting subsurface data or interpretation objects (data objects) may be associated with the new event (A) in FIG. 6. Preexisting events (X,Y,Z) may include preexisting associations with one or more of the same (not shown) or different preexisting data objects as illustrated in FIG. 7A with solid lines.

In step 120, the method 100 determines if another new scheme should be initialized. If another new scheme should be initialized, then the method 100 returns to step 102. Otherwise, the method 100 proceeds to step 122. This step permits many different new schemes to be initialized for different categories of events.

Figure 7B:
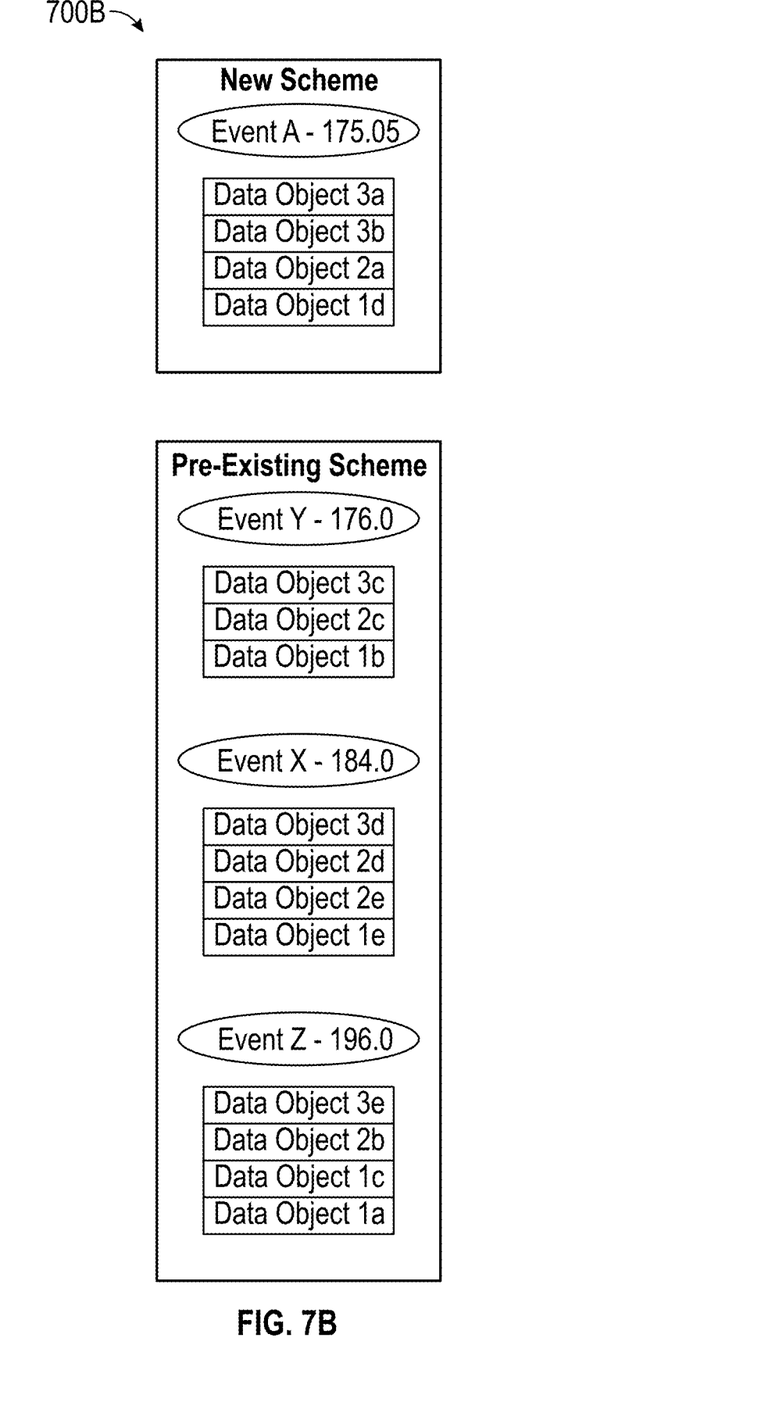
FIG. 7B is a schema diagram illustrating step 122 in FIG. 1.

In step 122, each new event added in step 104 for each respective new scheme initialized in step 102 is displayed with its respective numerical age calculated in step 112 and its respective-associated subsurface data or interpretation objects from step 118. In FIG. 7B, a schema diagram 700B illustrates an exemplary display of the preexisting data objects associated with the new event (A) and its numerical age in FIG. 7A. The schema diagram 700B also illustrates an exemplary display of the preexisting events (X,Y,Z), with their respective age, and their respective associations with the different preexisting data objects in FIG. 7A. Because all data objects are properly associated with one or more new events, and each new event has a current numerical age, quality control tasks, mistaken event relations, and out-of-date age information are reduced if not eliminated. The display of data objects is further enhanced due to the ability to schematically look at data objects in geologic time.

Figure 8:
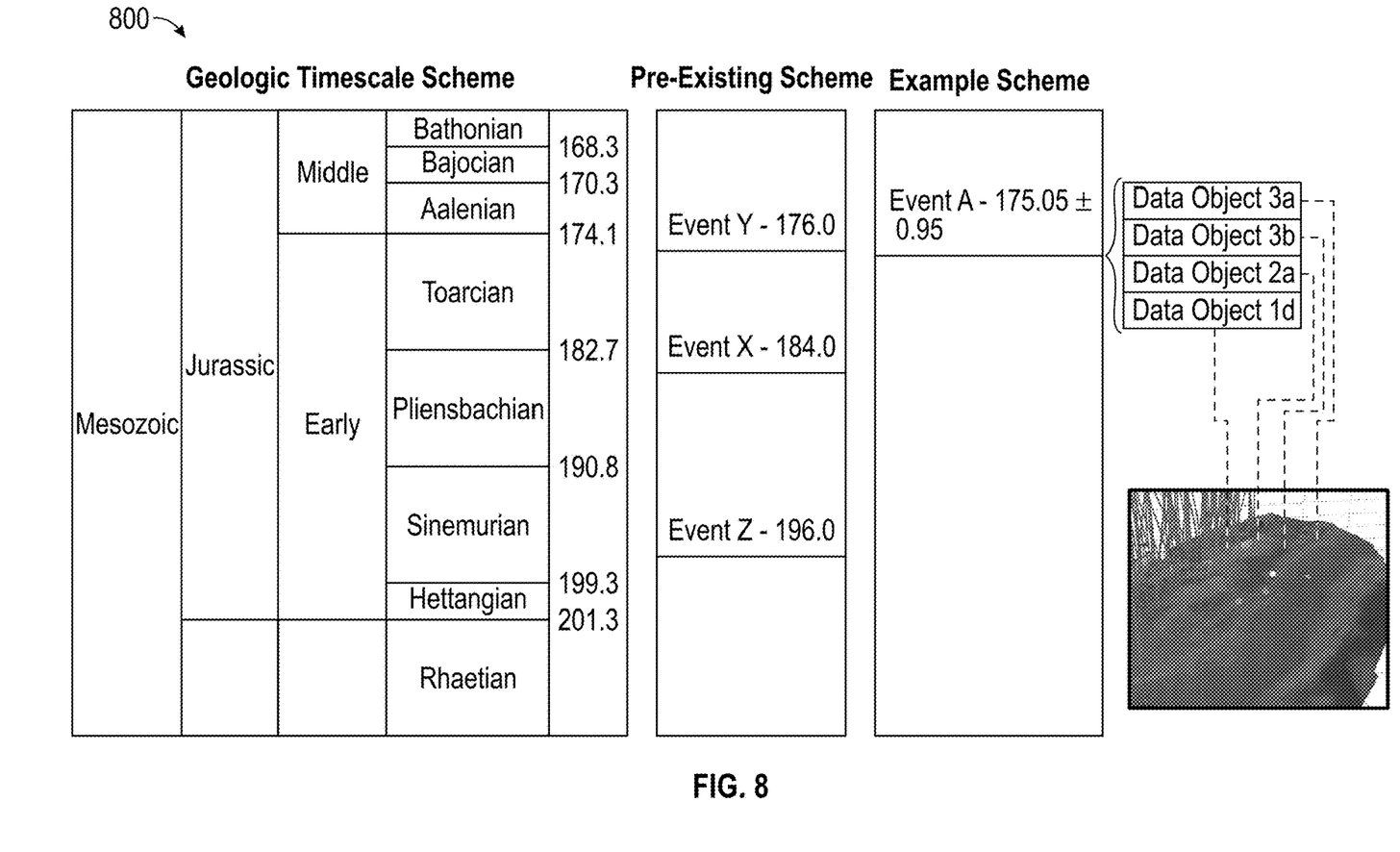
FIG. 8 is a schema diagram illustrating step 124 in FIG. 1.

In step 124, oil and gas prospects are identified and drilling operations are initiated based on the display from step 122. In FIG. 8, a schema diagram 800 illustrates the actual preexisting data objects (e.g. well picks, seismic horizons, biostratigraphic information, subsurface maps, and modeled surfaces) associated with the new event (A) and its numerical age in FIGS. 7A-7B. In order to display any time in Earth's history for the purposes of the identification of drilling prospects, the appropriate event or numerical age is simply selected. For example, a geologic age dating back 175.05 million years may be selected so that all of the subsurface data or interpretation objects known to represent that age may be displayed. The subsurface data or interpretation objects may then be compared with those of successively younger ages to gain a better understanding of the geological history of the drilling prospect. The displayed events may also be used to build a 3D geological subsurface model or map, which in turn uses all subsurface data or interpretation objects associated with those events. The construction of subsurface maps, models, and well plans is thus made more efficient through use of the method 100.

The method 100 also enables better interpretation decisions and geologic analysis with the additional knowledge of a data object's age. If, for example, an event X is associated with a fault and event Y is associated with a horizon, interpretive conclusions can be made based on knowledge of their ages that couldn't be made without such knowledge. The method 100 therefore allows geoscientists to more efficiently and effectively identify drilling prospects, and allows reservoir engineers to more accurately drill wells. Because age relations are updated dynamically, inconsistencies are automatically reconciled, and data is attributed with geologic age information, the method 100 vastly improves the processing speed of a computer.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 9, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-8. The memory therefore, includes a geological-event age-updating module, which enables steps 110-114 described in reference to FIG. 1. The geological-event age-updating module may integrate functionality from the remaining application programs illustrated in FIG. 9. In particular, DecisionSpace® may be used as an interface application to perform steps 102-108 and 116-124 in FIG. 1. Although DecisionSpace® may be used as interface application, other interface applications may be used, instead, or the geological-event age-updating module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for determining a numerical age for geological events within a chronostratigraphic scheme, which comprises:
 a) relating each new event in a new scheme to at least one of one or more other new events in the new scheme, one or more preexisting events in a preexisting scheme and one or more intervals in a preexisting scheme, wherein the new scheme is a collection of each new event, each new event lacks a geological age, and an interval is a time between any two adjacent preexisting events, which represent interval events within the same preexisting scheme;
 b) ordering each relation from step a) into a preferred hierarchy for each new event in the new scheme, wherein the preferred hierarchy is updated on an event basis when a new event is added in the new scheme and includes a plurality of different age relations between a plurality of different events;
 c) amending the preferred hierarchy, using a computer processor, by starting with the highest relation in the preferred hierarchy and removing each lower relation in the preferred hierarchy that conflicts with a higher relation remaining in the preferred hierarchy; and d) calculating a numerical age of each new event, using the computer processor, based upon each relation from step a) in the amended preferred hierarchy by determining which two events of the plurality of events constrain a new event to a smallest numerical age range of the plurality of events based on age relations between the plurality of events and the new event and averaging numerical ages of the two events; and facilitating identification of one or more areas of hydrocarbon reserves based on the numerical age of each new event in the amended preferred hierarchy.

2. The method of claim 1, further comprising repeating steps c)-d) for a change in age of any of the other new events, the preexisting events and the interval events related to each respective new event.

3. The method of claim 1, further comprising:
adding another new event to the new scheme; and
repeating steps a)-d) for the another new event.

4. The method of claim 1, further comprising associating one or more preexisting subsurface data or interpretation objects with each respective new event.

5. The method of claim 4, further comprising displaying each new event in the new scheme with the numerical age for each respective new event and the associated subsurface data or interpretation objects for each respective new event.

6. The method of claim 5, further comprising initiating drilling operations based on the display of each new event in the new scheme with the numerical age for each respective new event and the associated subsurface data or interpretation objects for each respective new event.

7. The method of claim 1, wherein each relation from step a) establishes an age relation and is characterized as equal to, younger than, older than or within an interval.

8. The method of claim 7, wherein a conflict exists when the age relation of a lower relation cannot be reconciled with the age relation of a higher relation remaining in the preferred hierarchy.

9. The method of claim 1, wherein
the two events include at least one of a preexisting event, another new event and an interval event.

10. A non-transitory storage device tangibly carrying computer executable instructions for determining a numerical age for geological events within a chronostratigraphic scheme, the instructions being executable to implement:

a) relating each new event in a new scheme to at least one of one or more other new events in the new scheme, one or more preexisting events in a preexisting scheme and one or more intervals in a preexisting scheme, wherein the new scheme is a collection of each new event, each new event lacks a geological age, and an interval is a time between any two adjacent preexisting events, which represent interval events within the same preexisting scheme;

b) ordering each relation from step a) into a preferred hierarchy for each new event in the new scheme, wherein the preferred hierarchy is updated on an event basis when a new event is added in the new scheme and includes a plurality of different age relations between a plurality of different events;

c) amending the preferred hierarchy, using a computer processor, by starting with the highest relation in the preferred hierarchy and removing each lower relation in the preferred hierarchy that conflicts with a higher relation remaining in the preferred hierarchy; and d) calculating a numerical age of each new event, using the computer processor, based upon each relation from step a) in the amended preferred hierarchy by determining which two events of the plurality of events constrain a new event to a smallest numerical age range of the plurality of events based on age relations between the plurality of events and the new event and averaging numerical ages of the two events; and facilitating identification of one or more areas of hydrocarbon reserves based on the numerical age of each new event in the amended preferred hierarchy.

11. The storage device of claim 10, further comprising repeating steps c)-d) for a change in age of any of the other new events, the preexisting events and the interval events related to each respective new event.

12. The storage device of claim 10, further comprising:
adding another new event to the new scheme; and
repeating steps a)-d) for the another new event.

13. The storage device of claim 10, further comprising associating one or more preexisting subsurface data or interpretation objects with each respective new event.

14. The storage device of claim 13, further comprising displaying each new event in the new scheme with the numerical age for each respective new event and the associated subsurface data or interpretation objects for each respective new event.

15. The storage device of claim 14, further comprising initiating drilling operations based on the display of each new event in the new scheme with the numerical age for each respective new event and the associated subsurface data or interpretation objects for each respective new event.

16. The storage device of claim 10, wherein each relation from step a) establishes an age relation and is characterized as equal to, younger than, older than or within an interval.

17. The storage device of claim 16, wherein a conflict exists when the age relation of a lower relation cannot be reconciled with the age relation of a higher relation remaining in the preferred hierarchy.

18. The storage device of claim 10, wherein
the two events include at least one of a preexisting event, another new event and an interval event.

19. A non-transitory storage device tangibly carrying computer executable instructions for determining a numerical age for geological events within a chronostratigraphic scheme, the instructions being executable to implement:

a) relating each new event in a new scheme to at least one of one or more other new events in the new scheme, one or more preexisting events in a preexisting scheme and one or more intervals in a preexisting scheme, wherein the new scheme is a collection of each new event, each new event lacks a geological age, and an interval is a time between any two adjacent preexisting events within the same preexisting scheme;

b) ordering each relation from step a) into a preferred hierarchy for each new event in the new scheme, wherein the preferred hierarchy is updated on an event basis every time each new event is added in the new scheme and includes a plurality of different age relations between a plurality of different events;

c) amending the preferred hierarchy, using a computer processor, by starting with the highest relation in the preferred hierarchy and removing each lower relation in the preferred hierarchy that conflicts with a higher relation remaining in the preferred hierarchy;

d) calculating a numerical age of each new event, using the computer processor, based upon each relation from step a) in the amended preferred hierarchy by determining which two events of the plurality of events constrain a new event to a smallest numerical age range of the plurality of events based on age relations between the plurality of events and the new event and averaging numerical ages of the two events;

facilitating identification of one or more areas of hydrocarbon reserves based on the numerical age of each new event in the amended preferred hierarchy; and e) associating one or more preexisting data objects with each respective new event.

20. The storage device of claim 19, further comprising:

displaying each new event in the new scheme with the numerical age for each respective new event and the associated data objects for each respective new event; and initiating drilling operations based on the display of each new event in the new scheme with the numerical age for each respective new event and the associated data objects for each respective new event.

* * * * *